Figure 1:
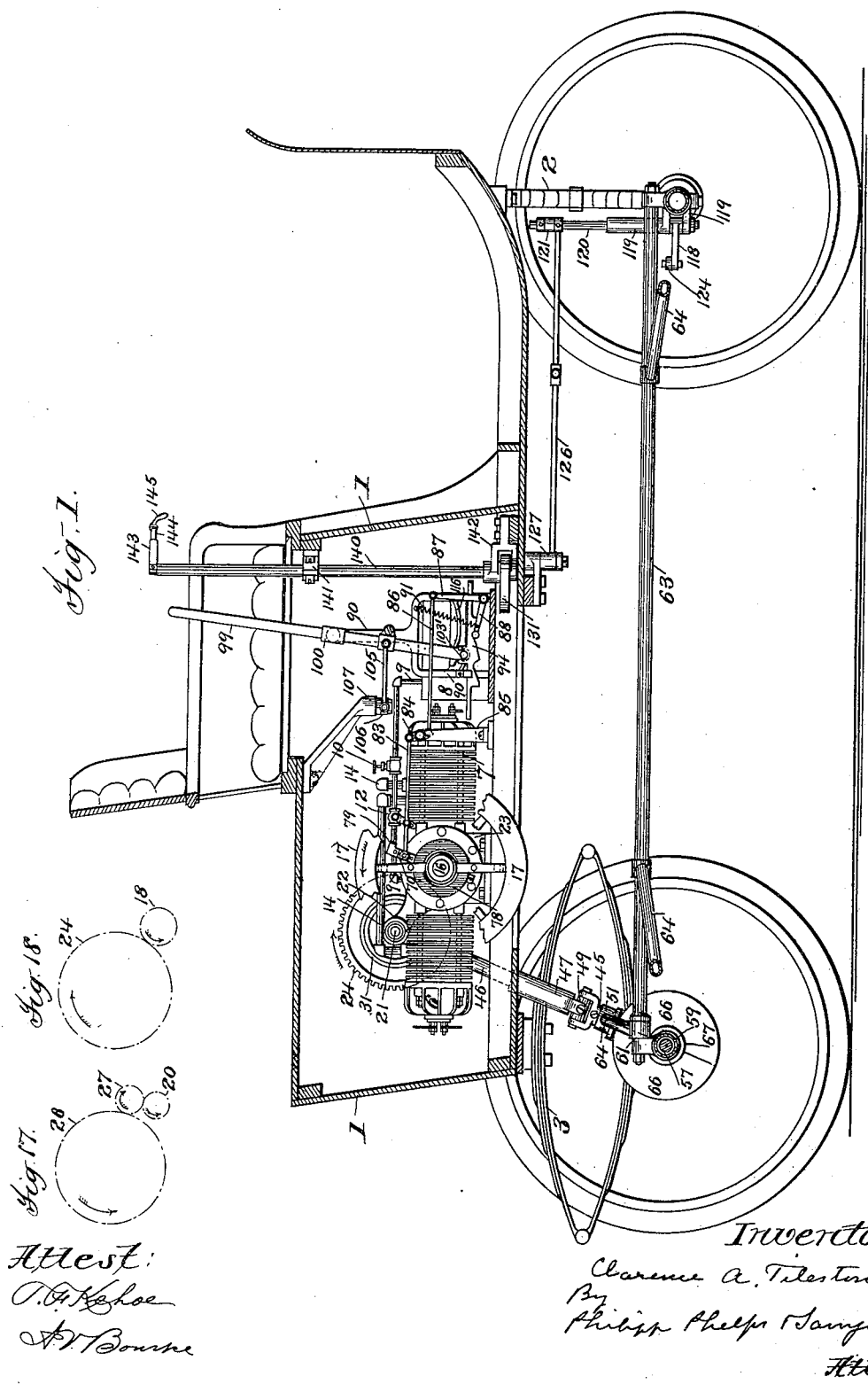

No. 666,239.  
C. A. TILESTON.  
MOTOR VEHICLE.  
(Application filed Apr. 16, 1900.)

(No Model.)

Patented Jan. 15, 1901.

7 Sheets—Sheet 1.

No. 666,239. Patented Jan. 15, 1901.
C. A. TILESTON.
MOTOR VEHICLE.
(Application filed Apr. 16, 1900.)
(No Model.) 7 Sheets—Sheet 2.

No. 666,239. Patented Jan. 15, 1901.
C. A. TILESTON.
MOTOR VEHICLE.
(Application filed Apr. 16, 1900.)
(No Model.) 7 Sheets—Sheet 3.

Attest:
T. A. Kehoe
A. V. Bourke

Inventor:
Clarence A. Tileston
By Phelps & Phelps & Sawyer
Attys

No. 666,239. Patented Jan. 15, 1901.
C. A. TILESTON.
MOTOR VEHICLE.
(Application filed Apr. 16, 1900.)
(No Model.) 7 Sheets—Sheet 4.
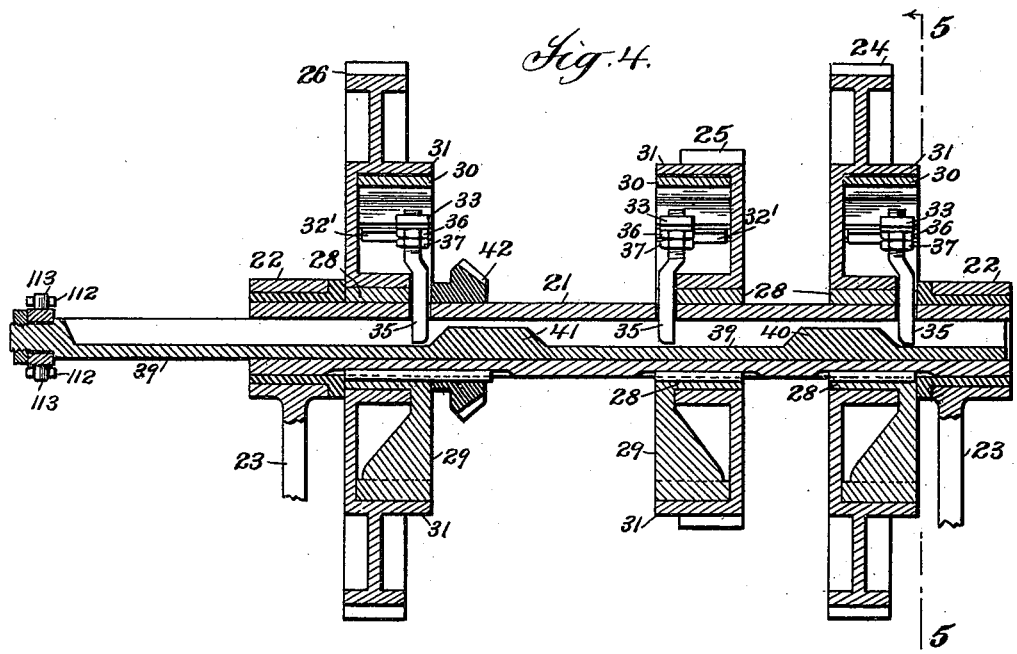
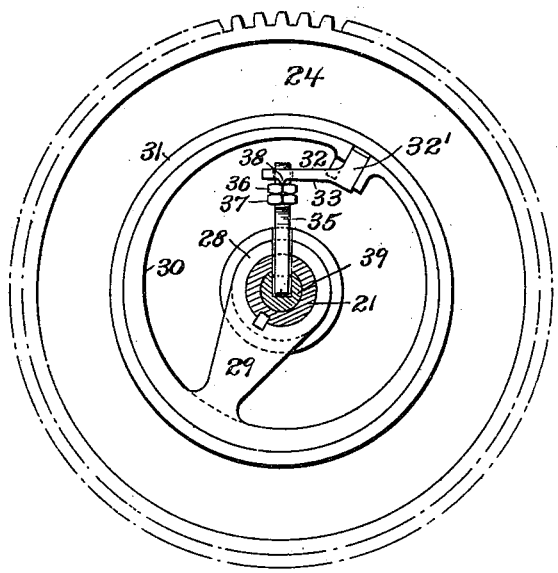
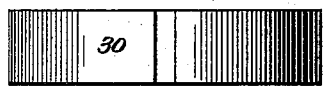
Attest:
J. F. Kehoe
A. T. Bourke
Inventor:
Clarence A. Tileston
By
Phelps, Phelps & Sanger
Attys No. 666,239. Patented Jan. 15, 1901.
C. A. TILESTON.
MOTOR VEHICLE.
(Application filed Apr. 16, 1900.)
(No Model.) 7 Sheets—Sheet 5.
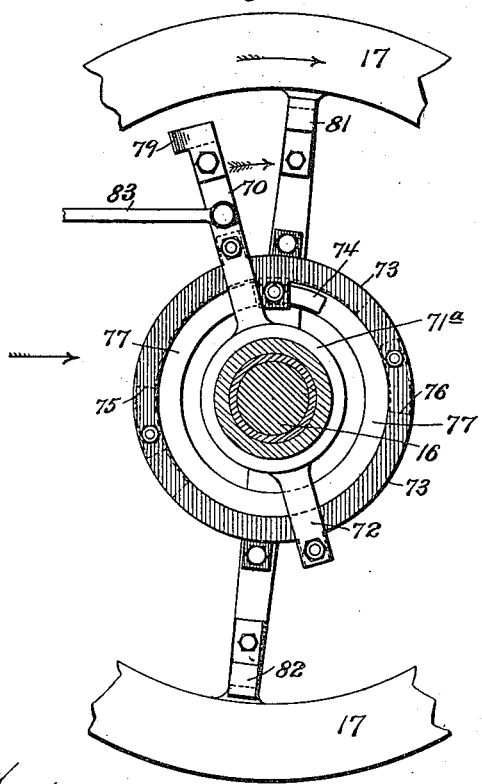
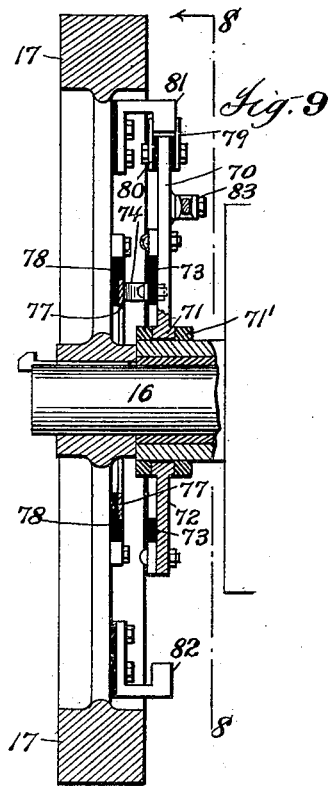
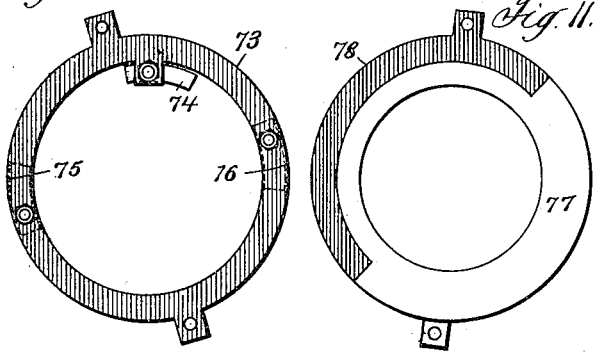
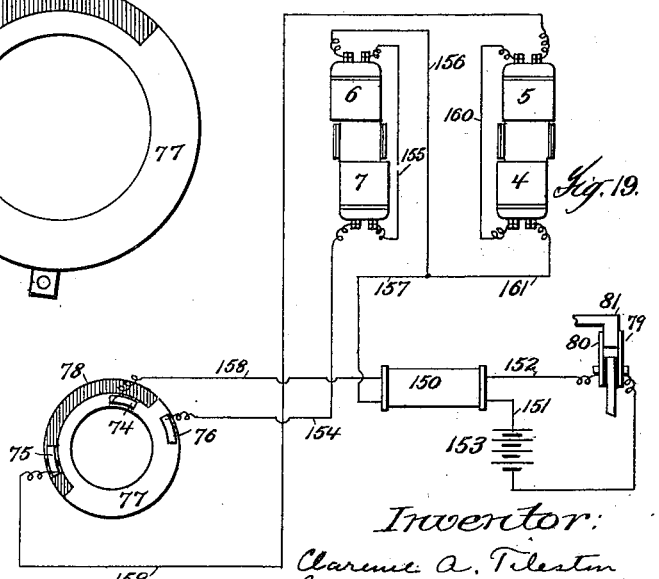
Attest.
O. F. Kehoe
A. T. Bourke
Inventor:
Clarence A. Tileston
By
Philipp Phelps Sanger
Attys No. 666,239. Patented Jan. 15, 1901.
C. A. TILESTON.
MOTOR VEHICLE.
(Application filed Apr. 16, 1900.)
(No Model.) 7 Sheets—Sheet 6.
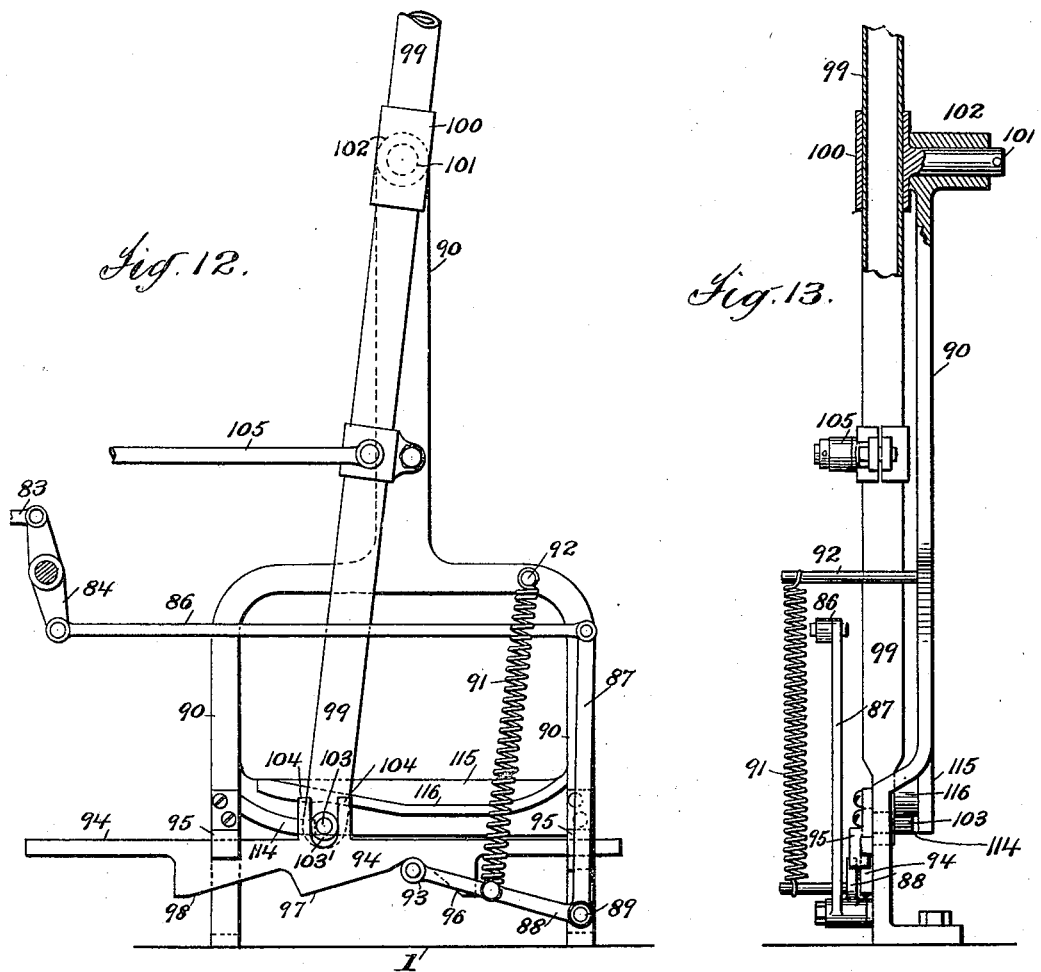
Attest:
J. F. Kehoe
A. T. Bourke
Inventor.
Clarence A. Tileston
By
Philipp Philp Sanger
Attys No. 666,239. Patented Jan. 15, 1901.
C. A. TILESTON.
MOTOR VEHICLE.
(Application filed Apr. 16, 1900.)
(No Model.) 7 Sheets—Sheet 7.
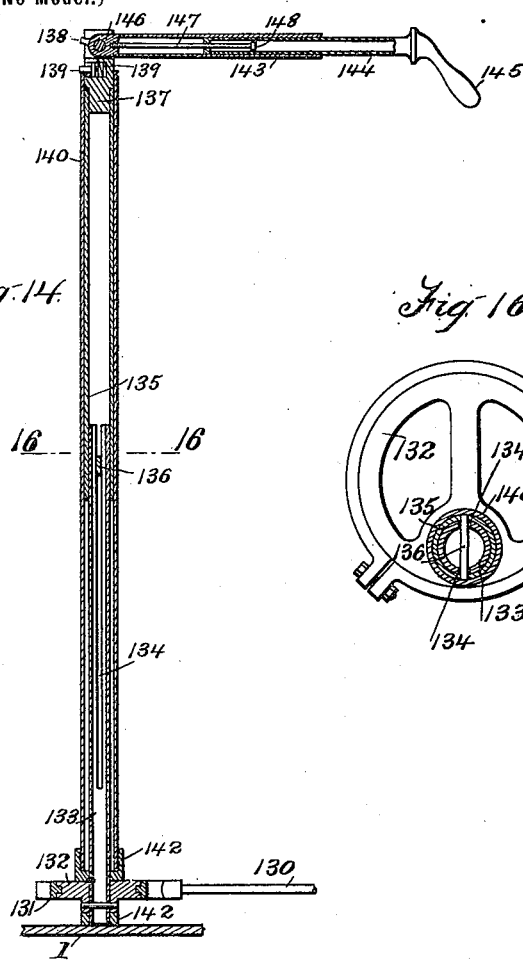
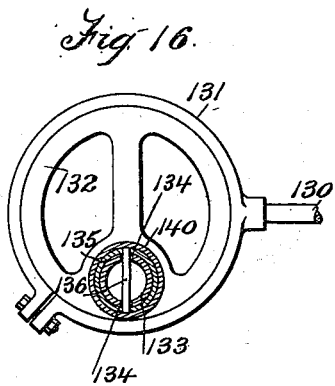
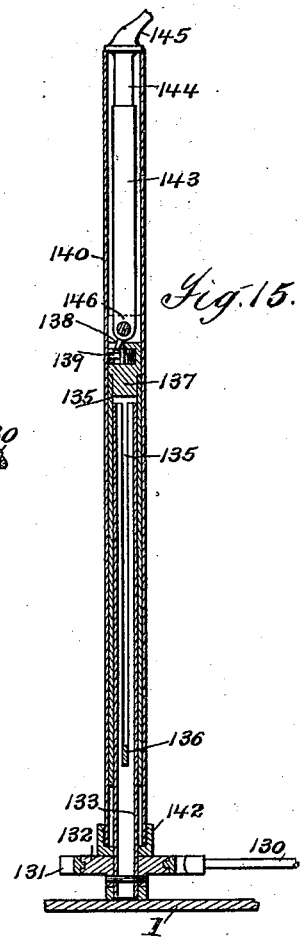
Attest:
O. F. Kehoe
A. D. Bourne
Inventor:
Clarence A. Tileston
By
Philipp, Philp, Sawyer
Attys
THE NORRIS PETERS CO., PHOTO-LITHO., WASHINGTON, D. C.

UNITED STATES PATENT OFFICE.

CLARENCE A. TILESTON, OF BINGHAMTON, NEW YORK.

MOTOR-VEHICLE.

SPECIFICATION forming part of Letters Patent No. 666,239, dated January 15, 1901.

Application filed April 16, 1900. Serial No. 12,981. (No model.)

*To all whom it may concern:*

Be it known that I, CLARENCE A. TILESTON, a citizen of the United States, residing at Binghamton, county of Broome, and State of New York, have invented certain new and useful Improvements in Motor-Vehicles, fully described and represented in the following specification and the accompanying drawings, forming a part of the same.

This invention relates to certain improvements in motor-vehicles.

One of the objects of this invention is to provide an improved form of connection between the motor and the driven axle, the connection being of such a character as to be undisturbed by the vertical movements and side swaying due to the spring-mounted body which carries the motor.

A further object of the invention is to improve the controlling means by which the several clutches which connect the different speed-gears to the shaft which they drive are operated.

A further object of the invention is to improve the controlling means for the igniting devices of hydrocarbon-motors, such as are employed with motor-vehicles, so that the speed of the motor may be varied in order to vary the speed of the vehicle.

A further object of the invention is to provide a single means by which the throttle mechanism, the time of operation of the igniting devices, and the clutch mechanism or any two of them may be controlled and varied in unison.

A further object of the invention is to improve the steering mechanism of motor-vehicles.

With these and other objects in view the invention consists in certain constructions and in certain parts, improvements, and combinations, as will be hereinafter fully described, and more specifically pointed out in the claims hereunto appended.

Figure 2:
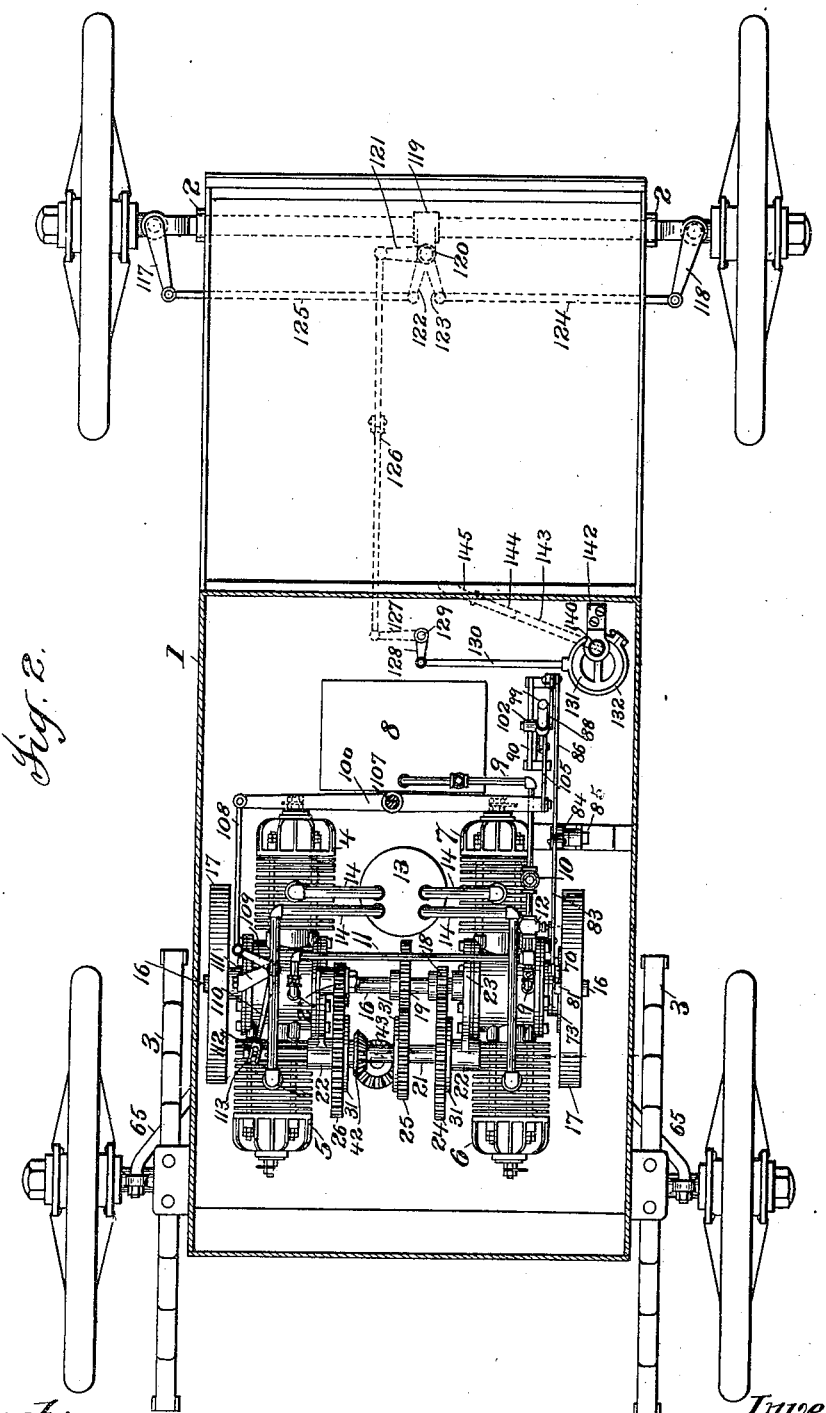
Figure 3:
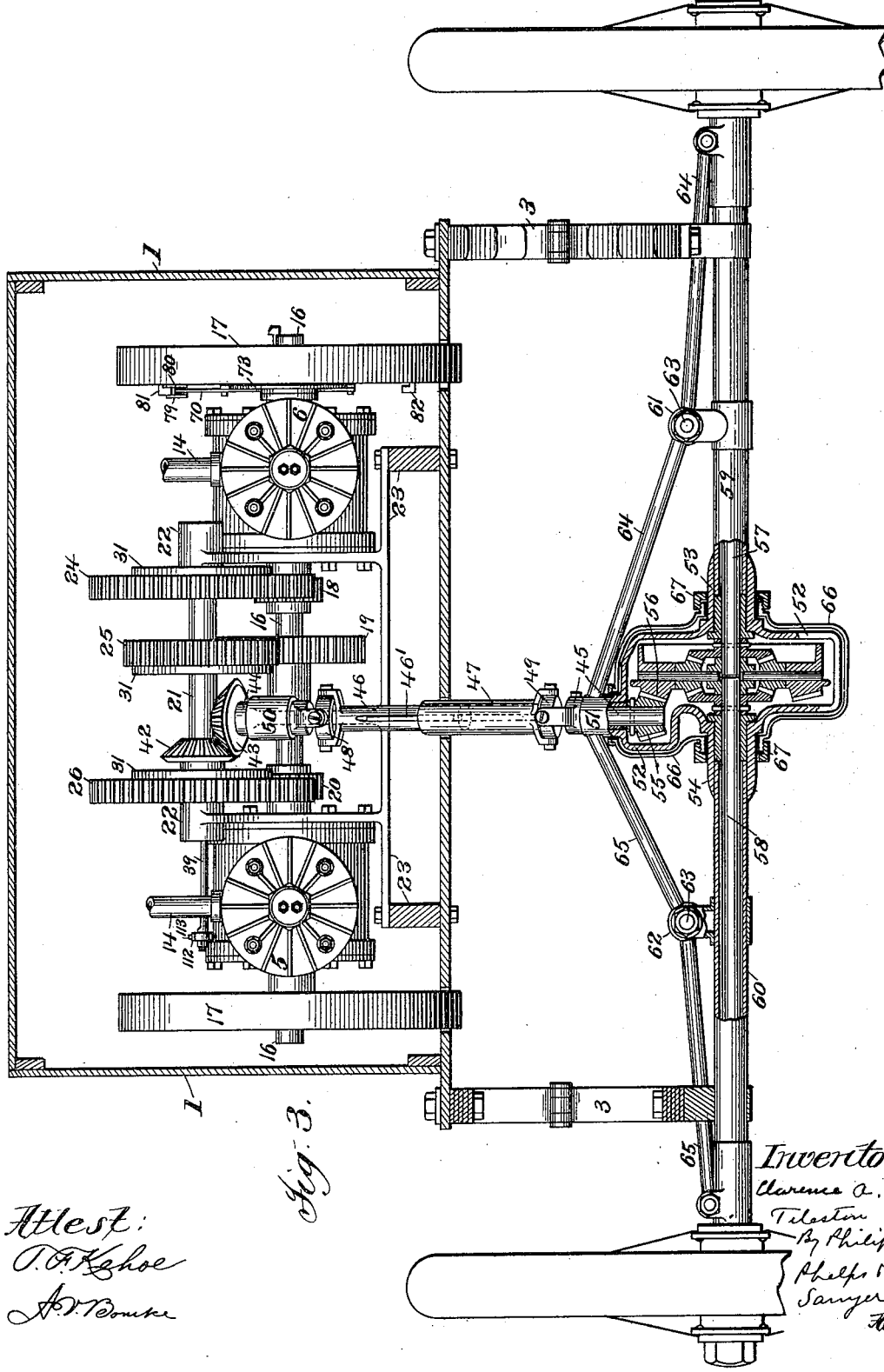

In the accompanying drawings, which form a part of this specification, and in which like characters of reference indicate the same parts, Figure 1 is an elevation of a motor-vehicle constructed in accordance with the invention, certain parts being shown in section. Fig. 2 is a plan view of the construction shown in Fig. 1. Fig. 3 is a rear elevation, certain parts being shown in section. Figs. 4, 5, 6, and 7 are detail views, on an enlarged scale, illustrating the clutch mechanism. Figs. 8, 9, 10, and 11 are detail views, on an enlarged scale, illustrating the means employed for controlling the time of igniting the gas mixture in the cylinders, and consequently the speed of the motor. Figs. 12 and 13 are detail views, on an enlarged scale, illustrating the construction of the controlling-lever by which the clutches, the throttle, and the operation of the igniting devices are controlled. Figs. 14, 15, and 16 are detail views, on an enlarged scale, illustrating the construction of the steering-handle. Figs. 17 and 18 are detail views illustrating a part of the gearing employed. Fig. 19 is a view of the circuits employed with the igniting devices.

Referring to the drawings, 1 indicates a vehicle-body, which may be of any suitable or desired construction. This body 1 is supported on a forward spring 2 and rear springs 3, which may be of any suitable construction, but are shown as of the ordinary bow form. The running-gear of the vehicle may be of any desired description.

The invention is illustrated in connection with a vehicle which is operated by a hydrocarbon-motor, although it is to be understood that some features of it are applicable to vehicles in which other forms of motor are employed. In the construction shown, 4, 5, 6, and 7 indicate the cylinders of a hydrocarbon-motor, the vapor mixture for the cylinders being drawn from a carbureter 8, although a vaporizer or any other suitable device might be employed instead of the carbureter. The carbureter is connected to the crank-chamber of the cylinders 6 and 7 by means of a pipe 9, provided with a suitable air-mixing valve, as 10, said pipe 9 being further provided with a branch pipe 11, which leads to the crank-chamber of the cylinders 4 5. The pipe 9 is also provided with a throttle-valve 12, said valve being operated by means which will be hereinafter described. The cylinders 4 5 6 7 are connected to a muffler 13, by means of suitable pipes 14, in the ordinary manner.

The crank-shaft of the motor is shown at 16, this shaft being provided with the usual fly-wheels 17. The shaft 16 is provided with suitable gears by which the power from the crank-shaft is transmitted. In the construction shown, however, and to illustrate the principle of the invention three such gears are employed—a low-speed gear 18, a high-speed gear 19, and a reversing-gear 20—although it is to be understood that any number of gears may be used. The gears 18, 19, and 20 drive other gears located on a suitably-arranged counter-shaft 21, mounted in bearings 22, secured to a suitable frame 23, located in the vehicle-body. The shaft 21 in the construction shown is provided with a gear 24, with which the gear 18 is in mesh, a gear 25, with which the gear 19 is in mesh, and a gear 26, which is operated through an intermediate 27 from the gear 20, and thus rotates reversely to the gears 24 and 25. The gears 24, 25, and 26 are loosely mounted on the shaft 21, and clutch devices, which may be of any suitable or desired form, are provided for connecting these gears to and disconnecting them from the shaft. In the preferred form of the construction (see Fig. 4) the shaft 21 is made hollow and each of the gears 24 25 26 is mounted on a hub 28, which is keyed to the shaft. From each of these hubs 28 extends an arm 29, to which is secured an expansible ring 30, these parts being preferably made integral. Each of the gears 24, 25, and 26 is formed with a circular rim or flange 31, within which the expansible ring 30 is contained. It will be readily understood that when the rings 30 are not expanded the gears 24, 25, and 26 will run loose on the hubs 28, the parts forming friction-clutches.

Any suitable means may be employed for expanding each of the rings 30, so as to bring them into frictional contact with the flanges 31. Preferably, however, and as shown, there is provided a rocking block or lever 32, having an angular operating end 32' and a lever extension 33. The angular operating end 32' is located between the ends of the expansible ring 30, and the extension 33 is provided with a perforation 34, which takes over a lifting pin 35, provided with a set-nut 36 and a lock-nut 37. The extension 33 is provided with a bearing projection 38, which rests upon the set-nut 36. As the lifting pin is moved up it will be seen that the angular operating end 32' of the rocking block will operate to separate the ends of the ring, and consequently force it against the flange 31.

Any suitable means may be employed to operate the lifting pins. Preferably, however, a slide 39 is located in the hollow shaft 21, the slide being provided with cams 40 and 41. These cams are preferably constructed as shown—that is to say, they have an incline at each end and a level surface between the two inclines of some considerable extent, so that after the clutch is thrown in the slide can be given considerable movement without disconnecting the clutch. It is obvious that when the slide 29 is moved to the right of the observer in Fig. 4 the lifting pin 35 of the clutch which controls the gear 24 will be operated, and this gear will be locked fast to the shaft. This being the slow-speed gear, it will operate to rotate the shaft at a low speed. If the movement of the slide to the right be continued, the lifting pin 35 of the clutch which controls the gear 24 will slip off the cam 40; but just as this occurs the cam 41 will come under the lifting pin 35 of the clutch which controls the gear 25, and thus the high-speed gear is thrown into operation. If, however, the slide is moved to the left of the observer in Fig. 4, the cam 41 will operate the lifting pin 35 of the clutch which controls the gear 26 and will secure this gear to the shaft. As the gear 26 is, however, the reversing-gear, this will operate the driving mechanism and cause a backward movement of the carriage. The devices for operating the slide 39 will be hereinafter described.

Any suitable means may be employed for transmitting the power from the counter-shaft 21 to the wheels of the vehicle. Preferably, however, the connections will be such as to provide for the swaying and rising and falling movements of the vehicle-body. As shown, the shaft 21 is provided with a gear 42, which meshes with a gear 43, said gear being mounted on a shaft which is of such a character as to permit the motions of the vehicle-body without interfering with the driving. In the construction shown this shaft consists of two studs 44 45 and two intermediate pieces 46 and 47. The parts 44 and 46 are connected by a suitable universal joint 48, and the parts 45 and 47 are connected by a similar universal joint 49. The parts 46 and 47 have a telescopic connection, the part 46 in the construction shown being the male part and being provided with a key 46', which engages with a groove in the part 47. The stud 44 is mounted in a suitable bearing 50, rising from the frame 23, and the stud 45 is mounted in a bearing 51, which is formed on a yoke 52, said yoke being also provided with bearings 53 and 54 for the rear axle. The stud 45 is provided with a bevel-gear 55. With this construction it will be seen that the rising and falling motions and the side swaying motion of the vehicle-body are permitted without in any way interrupting the driving connection between the gears 42 and 43 or the gear 55 and the part driven thereby, and, furthermore, the use of the second universal joint in the shaft compensates for any movement or change in angle given to the first joint and causes the speed of the shaft to be perfectly regular when its parts are out of line.

The means for transmitting the power from the gear 55 to the driven axle, which in this instance is the rear axle, may be widely varied. In the construction shown the gear 55 meshes with a gear 56, which is a part of an ordinary form of compensating gearing known in the art as the "jack-in-the-box." The rear axle is made in two parts 57 and 58, the part 57 being supported in the bearing 53 of the yoke 52 and the part 58 being supported in the bearing 54 of the yoke 52. The part 57 of the axle turns in a long sleeve 59 and the part 58 in a similar sleeve 60, said sleeves serving as a means of connection, in the construction shown, between the rear springs 3 and the axle. The sleeves 59 and 60 support fittings 61 and 62, to which are connected the longitudinal rods 63, extending between the front and rear axles, and these fittings further serve as points of attachment for braces 64 and 65, which extend to the bearing 51. The compensating gearing, the gear 55, and the yoke 52 are preferably inclosed by a two-part dust-cap 66. One part of said cap is shown in elevation in Fig. 3, and the other part is a counterpart of that shown. The two parts of the dust-cap 66 are held in position on the bearings 53 54 of the yoke 52 by means of threaded collars 67 or by any other suitable means.

In vehicles employing hydrocarbon-motors it is common to regulate the speed of the engine by changing the time at which the igniting devices explode the gas mixture in the cylinders and also by controlling through a throttle-valve or other similar valve the amount of gas mixture admitted to the cylinder. It is also common to regulate the speed at which the motor drives the vehicle by changing the gearing from high to low. The speed of the vehicle therefore depends upon two factors—namely, the speed of the motor and the relation of the parts of the driving-gearing. The speed of the motor usually depends upon two factors—namely, the amount of gas mixture introduced into the cylinders and the time in the stroke of the piston at which the ignition of the gas mixture takes place. In the present vehicle all these factors are or may be depended upon to control the speed of the vehicle.

The specific construction of the igniting devices may be varied within wide limits. Preferably, however, the construction will be substantially as shown.

Referring to Figs. 3, 8, 9, 10, and 11, an arm 70 is shown as projecting from a collar 71, said collar being secured on the crank-shaft bearing or any other suitable support. Collars 71' prevent any sidewise movements of the arm, though the arm may be given a slight movement of rotation about its support by the means and for the purpose to be hereinafter referred to. The collar 71 has a second arm 72, and the arms 70 and 72 serve to support a ring 73 of insulating material. This ring 73 carries a plurality of contacts, which will vary in number according to the number of cylinders employed. In the present instance three contacts are shown, these contacts being marked 74, 75, and 76, respectively. The fly-wheel 17 has secured thereto by bolts or in any other suitable manner a ring 78 of insulating material, this ring having inlaid therein or secured thereto a ring 77 of conducting material of the shape shown in Fig. 11. The outer part of the compound ring is made up of a half-circumference of conducting material and a half-circumference of insulating material, while the inner portion of the compound ring is entirely of conducting material. The contact 74 on the ring 73 is arranged so that it always bears against the conducting portion 77 of the compound ring. The contacts 75 and 76 are arranged on the ring 73 one hundred and eight degrees apart, so that when one of these contacts is on the conducting portion 77 of the ring the other is on the insulating portion 78. When, therefore, the contact 76 is on the conducting portion of the ring, a circuit is closed through this ring between the contacts 76 and 74. When, however, the contact 75 is on the conducting portion 77 of the ring, a circuit is closed through the ring between the contact 75 and the contact 74.

The igniting devices employed are preferably of the ordinary well-known jump-spark description, and in the present construction the cylinders of the motor are arranged in pairs, the igniting devices of each pair of cylinders being wired in series. Two secondary circuits are therefore employed, one of these circuits containing the igniting devices for one pair of cylinders and the other circuit containing the igniting devices for the other pair of cylinders. The contacts 74 and 76 control the secondary circuit for one pair of cylinders and the contacts 74 and 75 control the secondary circuit for the other pair of cylinders.

The primary circuit may be controlled in any suitable manner. In the construction shown the arm 70 has further secured to it two circuit terminals or contacts 79 80, which are in the primary circuit of the igniting devices. The fly-wheel carries two bridge-pieces 81 82 of conducting material, said bridge-pieces being preferably insulated from the fly-wheel. Each of these bridge-pieces 81 82 is arranged to pass between the contacts 79 and 80 and makes and breaks the circuit at this point. The bridge-piece 81 establishes a circuit between the contacts 79 and 80, while the circuit is closed between the contacts 75 and 76. It is to be understood, however, that the primary circuit controlled by the contacts 79 and 80 is both made and broken while the secondary circuit controlled by the contacts 75 and 76 is established. The secondary circuit therefore, through the jump-spark devices, causes a spark in the pair of cylinders in the circuit and ignites the gas mixture therein. In the same manner the bridge-piece 82 makes and breaks the primary circuit between the contacts 79 and 80, while the secondary circuit is established between the contacts 74 and 75. Inasmuch as the fly-wheel is connected to the crank-shaft, which is of course in turn connected to the piston, the position of the bridge-pieces 81 and 82 and the position of the conducting portion 77 and the insulating portion 78 is always unvarying with relation to the stroke of the piston—that is to say, the bridge-pieces and the ring, with its insulating portion, are always at the same point in the circumference they describe at the time when the piston occupies any given position—as, for instance, its extreme outward position. If now the arm 70 is caused to change its circumferential position with relation to the bearing through which the crank-shaft which carries the fly-wheel passes, it will be seen that the bridge-pieces 81 and 82 will pass into and out of contact with their coöperating terminals 79 and 80 either earlier or later in the revolution of the fly-wheel. It will also be seen that any shifting of the position of the arm 70 will carry the ring 73 and its contacts 74 75 76 around with it, so that the contacts 75 and 76 will run off the non-conducting portion 78 of the ring earlier or later in the revolution of the fly-wheel, according to the change made in the position of the arm—that is to say, if the wheel is rotating in the direction of the arrow in Fig. 8 and the arm 70 is moved in the direction of the feathered arrow in the same figure the making and breaking of the circuits will take place later in the stroke of the piston, and consequently the ignition will be later and the speed of the motor will be slower. If, on the other hand, the arm 70 be moved in the other direction, the reverse of the operations described will take place.

Any suitable means may be employed for rotating the arm 70, thus changing its position on the hub of the crank-shaft bearing. In the construction shown this arm has connected to it a link 83, said link being connected to a short lever 84, pivoted on the standard 85, suitably supported in the body of the vehicle. The other end of the lever 84 is connected, by means of a link 86, to one of the arms of a bell-crank lever 87 88, said lever being pivoted at 89 to the frame 90 of a controlling-lever, to be hereinafter described. The arm 88 of the bell-crank lever is connected by a spring 91 to a stud 92, the spring operating to hold the parts in a given position, which, as shown, is the position in which the ignition takes place at the latest point in the stroke of the piston and the motor is running at its lowest speed. The throttle-valve 12, before described, is also connected to the link 83, so that in the position shown in Figs. 1 and 12 the throttle-valve is nearly closed and only a small amount of gas is being supplied to the cylinders.

The means for operating the bell-crank 87 88 in order to change the position of the arm 70 and the throttle-valve may be varied within wide limits. In the construction shown the arm 88 of the bell-crank is provided with a friction-roller 93, said roller being in contact with a cam-slide 94, which moves in guides 95 on the frame 90. The cam-slide 94 is provided with a plurality of cams, which may vary in number. For the purpose of illustrating the invention three such cams 96 97 98 are shown, it being understood, of course, that these cams may be of any suitable configuration. In the present construction the cam-slide 94 is operated by means of a lever 99, which passes through a sleeve 100, mounted on a pivot 101, which works in a bearing 102 on the frame 90. The lever is therefore free to slide through the sleeve. The lower end of the lever 99 is provided with a pin 103, which preferably carries a roll 103', said roll taking between projections or ears 104 on the cam-slide. As the lever 99 is rocked on its pivot, therefore, the cam-slide 94 will be moved forward and backward and the bell-crank lever 87 88 operated through the connections before described to turn the throttle-valve and to vary the position of the arm carrying the igniting devices. The lever 99 has further connected to it a link 105, which is connected to a horizontal lever 106, said lever being pivoted at 107. To the other end of the lever 106 is connected a link 108, which is connected to a bell-crank lever 109 110, said lever being pivoted on a bracket 111. The arm 110 of the bell-crank lever is forked at 112 and takes over studs 113, connected to the clutch-operating slide 39, before described. As the lever 99 is operated in one direction, therefore, it not only controls the throttle and the time of ignition, but it also controls the position of the slide 39, and therefore determines whether any of the clutches shall be in operation and, if so, which of them.

The cam 96 on the slide 94 is the cam which controls the throttle-valve and the position of the arm 70, carrying the igniting devices, when the lever 99 is moved to throw the clutch controlling the reversing-gear into action. The cam 97 is the cam which controls the throttle-valve and the arm carrying the igniting devices when the clutch for the slow-speed gear is thrown into action, and the cam 98 is the cam which controls the position of the arm carrying the igniting devices and the throttle when the clutch for the high-speed gear is thrown into operation. It will be noticed that the depression between the cams 96 and 97 is deep enough so that when the roller 93 is in it the arm 87 of the bell-crank 87 88 assumes its extreme position to the right of the observer under the stress of the spring 91. In this position the throttle-valve is closed down, so as to admit the smallest possible amount of gas mixture to the cylinders, and the arm carrying the igniting devices is positioned so as to produce the slowest speed of the motor. At this point, therefore, the motor is running at its slowest speed and the clutch-slide 39 is in such a position that all the clutches are disengaged. The motor and the gears 24 25 26 on the counter-shaft 21 are running idly and producing no movement of the vehicle. As the lower end of the lever 99 moves to the right, the clutch for the slow-speed gear 24 begins to be thrown in by the operation of the cam 40. As the lever 99 continues its movement to the right, causing the cam 40 to operate on the clutch, the roll 93 travels up the incline of the cam 97, gradually opening the throttle-valve, gradually changing the time of operation of the igniting devices, and thus gradually increasing the speed of the motor. This increase in speed of the motor continues until the roll 93 reaches the highest point of the cam 97, and during this increase of speed the lifting pin 35 of the slow-speed clutch has been raised onto the top of the cam 40, which has been traveling under it. If a further increase in speed is desired, the lever 99 is operated so as to cause its lower end to move still farther to the right. This causes the cam 40 to pass out from under the lifting pin 35 of the low-speed clutch, and as this occurs the roll 93 travels down the short incline of the cam 97, thus operating on the throttle-valve and igniting devices and slowing the speed of the motor again. As this occurs, the cam 41 begins to throw in the high-speed clutch, but the engagement of the clutch takes place when the speed of the motor is slowed, thus avoiding shock or strain to the driving-gear. As soon as the high-speed clutch is engaged the roll 93 begins to travel up the incline of the cam 98, gradually increasing the speed of the motor through the connections described, this increase continuing until the roll 93 has reached the top of the incline of the cam 98.

As has been before stated, in order to throw in the clutch for the reversing-gear it is necessary to move the cam-slide 94 to the left of the observer. Assuming the roll 93 to be at the point shown in Fig. 12, the operations produced by moving the slide to the left and causing the roll 93 to travel up the incline of the cam 96 are the same, so far as the operation of the throttle-valve and the change in the time of operation of the igniting devices are concerned, as when the lever is moved to throw in the low-speed clutch. In this case, however, the cam 41 operates upon the pin 35 of the clutch for the reversing-gear. By the movement of the lever to the left, therefore, from the point shown in Fig. 12 the throttle-valve is opened, the time of the action of the igniting devices is changed, and the clutch for the reversing-gear is thrown in.

When the slide is quickly moved in order to bring the vehicle to a sudden stop from either a high or a low speed, there might be danger of throwing the slide too far and so throwing in the reversing-clutch. To prevent this, a stop is provided which may be of any suitable description. In the construction shown this stop consists of a short rib 114, arranged in the path of a continuation of the pin 103, which carries the roller 103'. The end of this rib 114 is located so that the pin 103 will strike its end when the roller 93 is in the position shown in Fig. 12—that is, at the bottom of the depression between the cams 96 and 97. In order to throw in the reversing-clutch, it is necessary to disengage the pin 103 from the rib 114. This is effected in the construction shown by raising the lever 99, thus causing it to move through the sleeve 100. By this movement of the lever the pin 103 is lifted above the end of the rib 114. In order to prevent the pin 103 and the roll which it carries from being disengaged from between the projections or ears 104, a cross-bar 115 is preferably provided, said bar having a rib 116, under which the inner end of the pin 103 travels. On the left-hand side of the frame this rib is inclined upwardly and the rib 114 is arranged beneath it, the two forming a groove between them. When, therefore, the lever is raised and swung to the left in order to throw in the reversing-gear, the end of the pin 103 travels up on the inclined side of the rib 114, but is prevented from becoming disengaged from the projections 104 by means of the rib 116 on the bar 115. When after throwing in the reversing-clutch it is again desired to bring the vehicle to a stop or drive it ahead, the lever is thrown to the right, and in this movement the pin 103, traveling in the groove and beneath the rib 116, is guided down into its normal position, so that when it is again thrown to the left it will strike the stop 114.

Any suitable steering-gear may be employed in connection with the features of the invention before described. In the construction shown, however, the front wheels are pivoted on stub-axles, as is common, and to these axles are connected arms 117 118. Secured to the front axle is a bracket 119, in which is pivoted a vertical shaft 120. This vertical shaft has three arms 121 122 123. The arm 123 is connected to the arm 118 by means of a link 124, and the arm 122 is connected to the arm 117 by means of a link 125. The arm 121 is connected by means of a link 126 to one arm 127 of a bell-crank lever 128, which is pivoted at 129 to the vehicle-body. The arm 128 is connected, by means of a link 130, to any suitable operating mechanism. In the preferred construction this operating mechanism consists of an eccentric 131, to the strap 132 of which the link 130 is connected. The eccentric 131 may be operated in any suitable manner. As shown, this eccentric is secured to a tubular shaft 133, said shaft being provided with a slot 134. A sleeve 135 is telescopically connected to the shaft 133 and is provided with a rib or projection 136, which engages the slot in the said shaft. To the upper end of the sleeve 135 is connected a block 137, to which is pivoted another block 146, which forms part of the steering-handle. The block 137 is provided with a spring-pin 139, said pin taking over the top of a casing 140, which is secured in position in the vehicle-body by means of brackets 141 142 or in any other suitable manner. The spring-pin 139 is engaged by a projection 138 on the block 146 when the handle is turned on its pivot and the pin 139 is forced inward. The sleeve 135 is then free to slide downward in the casing 140 and over the shaft 133, the position of the parts then assumed being shown in Fig. 15. In this position the handle is out of the way of a person entering or leaving the vehicle.

The handle is preferably constructed of a sleeve 143, in which is mounted a second sleeve 144, to which a grip 145 is connected, the grip preferably standing at an angle to the sleeve. The sleeve 144 is preferably so constructed as to have an adjustment lengthwise of the sleeve 143 and also a radial adjustment with respect to this sleeve. Any suitable means may be used for connecting the sleeves 143 and 144, so as to permit these two adjustments. In the construction shown the inner end of the sleeve 143 carries the block 146 before referred to, said block having a tapped opening therein. A long bolt 147 passes through an opening in the bottom of the sleeve 144, the head 148 of the screw 147 lying in the sleeve 144. With the construction as before described when the handle is in the steering position, or the position shown in Fig. 14, the sleeve 144 is allowed to turn in the sleeve 143 as the handle is given its steering movements and a lengthwise adjustment of the two sleeves is permitted, so that the handle may be in the easiest possible position during the steering operation.

The circuits employed for the sparking devices may be of any suitable character. Suitable circuits are shown in Fig. 19. In this figure an induction-coil 150 is shown, the primary circuit-wires of said coil being marked 151 and 152, said wires containing a battery 153 and the contacts 79 and 80, before described. From the contact 76 the wire 154 is led to the jump-spark terminals of the cylinder 7. From this cylinder a wire 155 leads to the jump-spark terminals of the cylinder 6, and from these terminals a wire 156 leads, said wire joining a wire 157, which leads to one of the secondary terminals of the coil 150. From the other secondary terminal the wire 158 leads to the contact 74. From the contact 75 the wire 159 leads to the jump-spark terminals of the cylinder 5. From these terminals a wire 160 leads to the terminals of the cylinder 4, and from these terminals a wire 161 leads to the wire 157, before referred to. In the position of the parts shown in the figure a secondary circuit is made from the contact 74 through the wire 158 to the coil 150 and from the coil through the wire 157 to the wire 156. From this wire 156 the circuit goes through the jump-spark terminals of the cylinder 6 and then by the wire 155 through the jump-spark terminals of the cylinder 7. From these terminals the circuit goes by the wire 154 to the contact 76. The contacts 76 and 74 are connected through the conducting portion 77 of the compound ring. The primary circuit is so simple that it is unnecessary to trace it, and it will be understood that as the bridge-piece 81 passes out from between the contacts 79 80 a spark will take place in the cylinders 6 and 7. As the contact 76 passes off the conducting portion 77 of the compound ring and onto the non-conducting portion 78 the contact 75 passes from the non-conducting portion 78 onto the conducting portion 77. A circuit is now made through the wires 159 160 161 157 to the coil and from the coil by the wire 158 to the contact 74, these two contacts being connected through the conducting portion 77 of the ring.

It is to be understood that the construction by which the several features of the invention are carried into effect may be varied within wide limits. The invention is not, therefore, to be limited to the specific details of construction which have been hereinbefore described.

What is claimed is—

1. In a motor-vehicle, the combination with a spring-mounted body, of a motor carried thereby, a running-gear including a driven axle, compensating gearing for driving said axle, a divided shaft connecting the compensating gearing and the motor, said shaft extending in a generally vertical direction and having parts connected by universal joints and parts in telescopic connection with each other, a bearing for the shaft, and brace-rods extending from the bearing to the driven axle, substantially as described.

2. In a motor-vehicle, the combination with the vehicle-body, of a motor carried thereby, a two-part axle, driving-gearing for the two parts of the axle, a shaft connecting the motor and the driving-gearing, a yoke formed to provide bearings for the shaft and each part of the axle, and brace-rods extending from the shaft-bearing to the axle, substantially as described.

3. In a motor-vehicle, the combination with a spring-mounted body, of a motor carried thereby, a two-part driven axle, compensating gearing for driving the axle, a divided shaft connecting the compensating gearing and the motor said shaft extending in a generally vertical direction and having parts connected by universal joints and parts in telescopic connection with each other, and a yoke formed to provide bearings for the shaft and each part of the axle, substantially as described.

4. In a motor-vehicle, the combination with a spring-mounted body, of a motor carried thereby, a two-part driven axle, compensating gearing for driving the axle, a divided shaft connecting the compensating gearing and the motor, said shaft extending in a generally vertical direction, and having parts connected by universal joints and parts in telescopic connection with each other, a yoke formed to provide bearings for the shaft and each part of the axle, and brace-rods extending from the shaft-bearing to the axle, substantially as described.

5. In a motor-vehicle, the combination with a driven two-part axle, of a compensating gearing for driving the same, a shaft, a gear on said shaft in mesh with the compensating gearing, a two-part dust-cap inclosing the compensating gearing and the driving-gear, said cap having openings for the shaft and the two parts of the axle and bearings for the shaft independent of the dust-cap, substantially as described.

6. In a motor-vehicle, the combination with a driven two-part axle, of a compensating gearing for driving the same, a shaft, a gear on said shaft in mesh with the compensating gearing, a two-part dust-cap inclosing the compensating gearing and the driving-gear, said cap having openings for the shaft and the two parts of the axle, retaining-collars for holding the two parts of the cap together and bearings for the shaft independent of the dust-cap, substantially as described.

7. The combination with a driving-shaft, of a plurality of gears mounted thereon, a counter-shaft, a plurality of gears loosely mounted on said counter-shaft and driven by the gears on the driving-shaft, a friction-clutch including an expansible ring for connecting each gear to the counter-shaft, a rocking block for expanding each ring, each block having a lever extension, a lifting-pin loosely connected to each lever extension, and means for operating the pins, substantially as described.

8. The combination with the driving-shaft, of a plurality of gears mounted thereon, a counter-shaft, a plurality of gears loosely mounted on said counter-shaft and driven by the gears on the driving-shaft, a friction-clutch including an expansible ring for connecting each of the gears to the counter-shaft, a rocking block for expanding each ring, each block having a lever extension, a lifting pin loosely connected to each lever extension, and a cam-slide for operating the pins, substantially as described.

9. The combination with a shaft, of a hub connected thereto, an expansible ring connected to the hub, a gear loosely mounted on the shaft and having a flange coöperating with the expansible ring, a rocking block for expanding the ring, said block having a lever extension, a lifting pin to which the lever extension is loosely connected, and means for operating the pin, substantially as described.

10. The combination with a shaft, of a hub connected thereto, an expansible ring connected to the hub, a gear loosely mounted on the shaft and having a flange coöperating with the expansible ring, a rocking block for expanding the ring, said block having a lever extension, a lifting pin to which the lever extension is loosely connected, and a cam-slide for operating the pin, substantially as described.

11. The combination with a shaft, of a gear loosely mounted thereon, an expansible ring for connecting the gear to the shaft, a rocking block for expanding the ring, said block having a lever extension which is provided with a bearing projection, a lifting pin to which said lever extension is connected, means carried by the pin against which the projection bears, and means for operating the pin, substantially as described.

12. The combination with a shaft, of a gear loosely mounted thereon, an expansible ring for connecting the gear to the shaft, a rocking block for expanding the ring, said block having a lever extension which is provided with a bearing projection, a lifting pin to which said lever extension is connected, adjustable means carried by the pin against which the projection bears, and means for operating the pin, substantially as described.

13. In a motor-vehicle, the combination with a hydrocarbon-motor, of a throttle-valve for controlling the admission of gas to the motor, igniting devices, and means for simultaneously operating the throttle-valve and changing the time of operation of the igniting devices, substantially as described.

14. In a motor-vehicle, the combination with a hydrocarbon-motor, of a throttle-valve for controlling the admission of gas to the motor, suitable igniting devices, an arm the position of which controls the time of operation of the igniting devices, and means for simultaneously varying the position of the arm and operating the throttle-valve, substantially as described.

15. In a motor-vehicle, the combination with a hydrocarbon-motor, of a throttle-valve for controlling the admission of gas to the motor, suitable electric igniting devices therefor, an arm carrying contacts the position of which determines the time of operation of the igniting devices, and means for simultaneously varying the position of the arm and operating the throttle-valve, substantially as described.

16. In a motor-vehicle, the combination with a hydrocarbon-motor, of a throttle-valve for controlling the admission of gas thereto, suitable igniting devices, means for controlling the time of operation of said devices, a lever, connections between the throttle-valve and the lever, and connections between the controlling means for the igniting devices and the lever, substantially as described.

17. In a motor-vehicle, the combination with a hydrocarbon-motor, of a throttle-valve for controlling the admission of gas thereto, sets of gears whereby the motor drives the vehicle at varying speeds, a clutch mechanism for throwing the sets of gears into operation, and means for simultaneously operating the clutch mechanism and the throttle-valve, substantially as described.

18. In a motor-vehicle, the combination with a hydrocarbon-motor, of a throttle-valve for controlling the admission of gas thereto, sets of gears whereby the motor drives the vehicle at varying speeds, a clutch mechanism for throwing the sets of gears into operation, a lever, connections between the lever and the clutch mechanism and connections between the lever and the throttle-valve, whereby a single lever operates both the throttle-valve and the clutch mechanism, substantially as described.

19. In a motor-vehicle, the combination with a hydrocarbon-motor, of a throttle-valve for controlling the admission of gas thereto, igniting devices, means for varying the time of operation of the igniting devices, sets of gears whereby the motor drives the vehicle at varying speeds, clutch mechanism for throwing the sets of gears into operation, and means for simultaneously operating the throttle-valve, the clutch mechanism, and the means for varying the time of operation of the igniting devices, substantially as described.

20. In a motor-vehicle, the combination with a hydrocarbon-motor, of a throttle-valve for controlling the admission of gas thereto, sets of gears whereby the motor drives the vehicle at varying speeds, clutch mechanism for controlling the sets of gears, a cam-slide for operating the clutch mechanism, and a common operating device for the cam-slide and the throttle, substantially as described.

21. In a motor-vehicle, the combination with a hydrocarbon-motor, of a throttle-valve for controlling the admission of gas thereto, suitable igniting devices, means for varying the time of operation of the igniting devices, sets of gears whereby the motor drives the vehicle at varying speeds, a clutch mechanism for controlling the sets of gears, a cam-slide for operating the clutch mechanism, and a common operating device for the cam-slide, the means for varying the time of operation of the igniting devices, and the throttle-valve, substantially as described.

22. In a motor-vehicle, the combination with a hydrocarbon-motor, of a throttle-valve for controlling the admission of gas thereto, suitable igniting devices, means for varying the time of operation of the igniting devices, sets of gears whereby the motor drives the vehicle at varying speeds, a clutch mechanism for controlling the sets of gears, a cam-slide for operating the clutch mechanism, a lever, and connections between the lever and the cam-slide, between the lever and the throttle-valve, and between the lever and the means for varying the time of operation of the igniting devices, substantially as described.

23. In a motor-vehicle, the combination with a hydrocarbon-motor, of means for varying the speed at which the motor drives the vehicle, suitable igniting devices, means for varying the time of ignition of said devices, and a common operating means for controlling the speed-varying means and the devices for varying the time of ignition of the igniting devices, substantially as described.

24. In a motor-vehicle, the combination with a hydrocarbon-motor, of sets of gearing whereby the motor drives the vehicle at different speeds, a clutch mechanism for throwing any of the sets of gearing into operation, igniting devices, means for varying the time of operation of the igniting devices, a lever, connections between the clutch mechanism and the lever, and connections between the means for varying the time of operation of the igniting devices and the lever, substantially as described.

25. In a motor-vehicle, the combination with a hydrocarbon-motor, of a throttle-valve for varying the admission of gas to the motor, igniting devices, means for varying the time of operation of the igniting devices, a cam mechanism, connections between the cam mechanism and the throttle-valve, and connections between the cam mechanism and the means for varying the time of operation of the igniting devices, and means for operating the cam mechanism, substantially as described.

26. In a motor-vehicle, the combination with a motor, of means for varying the speed of the motor, means for controlling the speed at which the motor drives the vehicle, a cam mechanism, connections between the cam mechanism and the speed-varying means for the motor, a lever for operating the cam mechanism, and connections between the lever and the means for varying the speed at which the motor drives the vehicle, substantially as described.

27. In a motor-vehicle, the combination with a motor, of means for varying the speed of the motor, means for controlling the speed at which the motor drives the vehicle, a cam-slide, connections between the cam-slide and the speed-varying means for the motor, a lever for operating the cam-slide, and connections between the lever and the means for varying the speed at which the motor drives the vehicle, substantially as described.

28. In a motor-vehicle, the combination with a motor, of means for varying the speed of the motor, sets of gears by which the motor drives the vehicle at varying speeds, a clutch mechanism for controlling the operation of the sets of gears, a cam mechanism, connections between the cam mechanism and the means for varying the speed of the motor, a lever, connections between the lever and the clutch mechanism, and means whereby the lever operates the cam mechanism, substantially as described.

29. In a motor-vehicle, the combination with a motor, of means for varying the speed of the motor, sets of gears whereby the motor drives the vehicle at varying speeds, a clutch for each set of gears, a cam mechanism including a cam for each clutch, connections operated by each cam as its clutch is thrown into and out of operation, whereby the cam varies the speed of the motor, and means for simultaneously operating the cam mechanism and the clutches, substantially as described.

30. In a motor-vehicle, the combination with a motor, of means for varying the speed of the motor, sets of gears whereby the motor drives the vehicle at varying speeds, a clutch for each set of gears, a cam-slide including a cam for each clutch, connections operated by each cam as its clutch is thrown into and out of operation, whereby the cam varies the speed of the motor, and means for simultaneously operating the cam-slide and the clutches, substantially as described.

31. In a motor-vehicle, the combination with a hydrocarbon-motor, of sets of gears whereby the motor drives the vehicle at varying speeds, a clutch for each set of gears, a throttle-valve for controlling the admission of gas to the motor, a cam mechanism including a cam for each clutch, connections between the cam mechanism and the throttle, a lever, connections between the lever and the clutches, and means whereby the lever operates the cam mechanism, substantially as described.

32. In a motor-vehicle, the combination with a hydrocarbon-motor, of sets of gears whereby the motor drives the vehicle at varying speeds, a clutch for each set of gears, igniting devices, means for varying the time of operation of the igniting devices, a cam mechanism including a cam for each clutch, connections between the cam mechanism and the means for varying the time of operation of the igniting devices, a lever, connections between the lever and the clutches, and means whereby the lever operates the cam mechanism, substantially as described.

33. In a motor-vehicle, the combination with a hydrocarbon-motor, of sets of gears whereby the motor drives the vehicle at varying speeds, a clutch for each set of gears, igniting devices, means for varying the time of operation of the igniting devices, a cam-slide including a cam for each clutch, connections between the cam-slide and the means for varying the time of operation of the igniting devices, a lever, connections between the lever and the clutches, and means whereby the lever operates the cam-slide, substantially as described.

34. In a motor-vehicle, the combination with a hydrocarbon-motor, of means for varying the speed of the motor, a cam mechanism including a plurality of cams for operating the speed-varying means for the motor, and means for varying the speed at which the motor drives the vehicle, substantially as described.

35. In a motor-vehicle, the combination with a motor, of sets of gears whereby the motor drives the vehicle, said gears including a high-speed gear, a low-speed gear, and a reversing-gear, clutches for throwing the gears into operation, means for varying the speed of the motor, said means including devices whereby the speed of the motor is varied whenever a change is made from one gear to another, and a common operating means for the clutches and the devices for varying the speed of the motor, substantially as described.

36. In a motor-vehicle, the combination with a motor, of sets of gears whereby the motor drives the vehicle, said gears including a high-speed gear, a low-speed gear and a reversing-gear, clutches for throwing the gears into operation, means for varying the speed of the motor, said means including devices whereby the speed of the motor is varied whenever a change is made from one gear to another, a lever, connections between the lever and the clutches whereby a movement of the lever in one direction operates the clutch for the reversing-gear, and a movement of the lever in the other direction operates the other clutches, and connections between the lever and the speed-varying means for the motor, substantially as described.

37. In a motor-vehicle, the combination with a hydrocarbon-motor, of sets of gears whereby the motor drives the vehicle, said gears including a high-speed gear, a low-speed gear, and a reversing-gear, clutches for throwing the gears into operation, a lever, connections between the lever and the clutches whereby a movement of the lever in one direction throws the clutch for the reversing-gear into operation, and the movement of the lever in the opposite direction throws the other gears into operation, a throttle-valve for controlling the admission of gas to the motor, and connections between the lever and the throttle-valve, substantially as described.

38. In a motor-vehicle, the combination with a hydrocarbon-motor, of sets of gears whereby the motor drives the vehicle, said gears including a high-speed gear, a low-speed gear, and a reversing-gear, clutches for throwing the gears into operation, a lever, connections between the lever and the clutches whereby a movement of the lever in one direction throws the clutch for the reversing-gear into operation, and the movement of the lever in the opposite direction throws the other gears into operation, igniting devices, means for varying the time of operation of the igniting devices, and connections between the lever and said means, substantially as described.

39. In a motor-vehicle, the combination with a hydrocarbon-motor, of sets of gears whereby the motor drives the vehicle, said gears including a high-speed gear, a low-speed gear, and a reversing-gear, clutches for throwing the gears into operation, a lever, connections between the lever and the clutches whereby a movement of the lever in one direction throws the clutch for the reversing-gear into operation and a movement of the lever in the opposite direction throws the other gears into operation, igniting devices, means for varying the time of operation of the igniting devices, a throttle-valve for controlling the admission of gas to the motor, connections between the means for varying the time of operation of the igniting devices and the lever, and connections between the lever and the throttle-valve, substantially as described.

40. In a motor-vehicle, the combination with a motor, of sets of gears whereby the motor drives the vehicle, said gears including a high-speed gear, a low-speed gear, and a reversing-gear, clutches for throwing the gears into operation, a lever, connections between the clutches and the lever, whereby a movement of the lever in one direction throws the clutches for the high and low speed gears into operation, and a movement of the lever in the opposite direction throws the clutch for the reversing-gear into operation, a stop for preventing the lever from moving to throw in the clutch for the reversing-gear, and means for rendering the stop inoperative, substantially as described.

41. In a motor-vehicle, the combination with a motor, of sets of gears whereby the motor drives the vehicle, said gears including a high-speed gear, a low-speed gear, and a reversing-gear, clutches for throwing the gears into operation, a lever, connections between the clutches and the lever, whereby a movement of the lever in one direction throws the clutches for the high and low speed gears into operation, and a movement of the lever in the opposite direction throws the clutch for the reversing-gear into operation, a stop for preventing the lever from moving to throw in the clutch for the reversing-gear, means for varying the speed of the motor, a cam mechanism for operating said means, connections whereby said cam mechanism is operated by the lever, and means whereby the lever may be caused to pass the stop without disengaging it from the cam mechanism, substantially as described.

42. In a motor-vehicle, the combination with a motor, of a plurality of sets of gears whereby the motor drives the vehicle at varying speeds, a clutch for throwing each set of gears into operation, a cam-slide having a cam projection for each clutch, a lever for operating the clutches, connections between the lever and the slide, and means for varying the speed of the motor, said means including a connection operated by the cam projections on the slide, substantially as described.

43. In a motor-vehicle, the combination with a hydrocarbon-motor, of a plurality of sets of gears whereby the motor drives the vehicle at varying speeds, a clutch for throwing each set of gears into operation, a cam-slide having a cam projection for each clutch, a lever for operating the clutches, connections between the lever and the slide, a throttle-valve for controlling the admission of gas to the motor, and connections whereby the throttle-valve is operated from the cam projections, substantially as described.

44. In a motor-vehicle, the combination with a hydrocarbon-motor, of a plurality of sets of gears whereby the motor drives the vehicle at varying speeds, a clutch for throwing each set of gears into operation, a cam-slide having a cam projection for each clutch, a lever for operating the clutches, connections between the lever and the slide, igniting devices, and means whereby the time of operation of the igniting devices is varied, said means being operated from the cam projections on the cam-slide, substantially as described.

45. In a motor-vehicle, the combination with a hydrocarbon-motor, of a plurality of sets of gears whereby the motor drives the vehicle at varying speeds, a clutch for throwing each set of gears into operation, a cam-slide having a cam projection for each clutch, a lever for operating the clutches, connections between the lever and the slide, igniting devices, means whereby the time of operation of the igniting devices is varied, a throttle-valve for controlling the admission of gas to the motor, connections whereby the means for varying the time of operation of the igniting devices are operated from the cam projections on the slide, and connections whereby the throttle-valve is operated from said cam projections, substantially as described.

46. In a motor-vehicle, the combination with a motor, of a plurality of sets of gears whereby the motor drives the vehicle at varying speeds, a clutch for throwing each of the sets of gears into operation, a lever, connections between the lever and the clutches, a cam-slide, having a projection for each of the clutches, means controlled by the projections on the slide for varying the speed of the motor, connections between the lever and the slide, a stop, means for rendering the stop inoperative, and means for guiding the lever in its movement, substantially as described.

47. In a motor-vehicle, the combination with a motor, of a plurality of sets of gears whereby the motor drives the vehicle at varying speeds, a clutch for throwing each of the sets of gears into operation, a lever, connections between the lever and the clutches, a cam-slide having a projection for each of the clutches, means controlled by the projections on the slide for varying the speed of the motor, ears on the slide, a projection on the lever taking between the ears, a stop in the path of movement of the lever, and means whereby the lever may be moved lengthwise to cause it to pass the stop, substantially as described.

48. In a motor-vehicle, the combination with a motor, of a plurality of sets of gears whereby the motor drives the vehicle at varying speeds, a clutch for throwing each of the sets of gears into operation, a lever, connections between the lever and the clutches, a cam-slide having a projection for each of the clutches, means controlled by the projections on the slide for varying the speed of the motor, ears on the slide, a projection on the lever taking between the ears, a stop in the path of movement of the lever, means whereby the lever may be moved lengthwise to cause it to pass the stop, and a guiding-rib for controlling the movement of the lever, substantially as described.

49. In a motor-vehicle, the combination with a motor, of a plurality of sets of gears whereby the motor drives the vehicle at varying speeds, a clutch for throwing each of the sets of gears into operation, a lever, connections between the lever and the clutches, a cam-slide having a projection for each of the clutches, means including a bell-crank operated by the slide for varying the speed of the motor, connections between the lever and the slide, a stop in the path of the lever, and means for causing the lever to pass the stop, substantially as described.

In testimony whereof I have hereunto set my hand in the presence of two subscribing witnesses.

CLARENCE A. TILESTON.

Witnesses:
S. M. MERCHANT,
ROLLAN R. ROLOSON.